United States Patent
Lee et al.

(10) Patent No.: US 9,342,867 B2
(45) Date of Patent: May 17, 2016

(54) APPARATUS AND METHOD FOR RECONSTRUCTING SUPER-RESOLUTION THREE-DIMENSIONAL IMAGE FROM DEPTH IMAGE

(71) Applicant: SAMSUNG ELECTRONICS CO., LTD., Suwon-si, Gyeonggi-do (KR)

(72) Inventors: Seung Kyu Lee, Seoul (KR); Hyun Jung Shim, Seoul (KR); Do Kyoon Kim, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 14/055,406

(22) Filed: Oct. 16, 2013

(65) Prior Publication Data
US 2014/0105484 A1    Apr. 17, 2014

(30) Foreign Application Priority Data
Oct. 16, 2012 (KR) .................. 10-2012-0114818

(51) Int. Cl.
*G06K 9/00* (2006.01)
*G06T 3/40* (2006.01)

(52) U.S. Cl.
CPC .................. *G06T 3/4053* (2013.01)

(58) Field of Classification Search
None
See application file for complete search history.

(56) References Cited

U.S. PATENT DOCUMENTS

| | | | |
|---|---|---|---|
| 2002/0061131 A1* | 5/2002 | Sawhney et al. | 382/154 |
| 2005/0063611 A1* | 3/2005 | Toki et al. | 382/299 |
| 2005/0220357 A1* | 10/2005 | Rifu | 382/255 |
| 2006/0083440 A1* | 4/2006 | Chen | 382/284 |
| 2008/0058593 A1* | 3/2008 | Gu et al. | 600/109 |
| 2008/0260279 A1* | 10/2008 | Volovelsky et al. | 382/254 |
| 2011/0193944 A1* | 8/2011 | Lian et al. | 348/47 |
| 2012/0056982 A1 | 3/2012 | Katz | |

FOREIGN PATENT DOCUMENTS

| | | |
|---|---|---|
| KR | 10-2010-0075329 | 7/2010 |
| KR | 10-2011-0078183 | 7/2011 |
| KR | 10-2012-0067098 | 6/2012 |
| KR | 10-2012-0071276 | 7/2012 |

* cited by examiner

*Primary Examiner* — Hadi Akhavannik
(74) *Attorney, Agent, or Firm* — NSIP Law

(57) ABSTRACT

An apparatus and method for reconstructing a super-resolution three-dimensional (3D) image from a depth image. The apparatus may include an error point relocation processing unit to relocate an error point in a depth image, and a super-resolution processing unit to reconstruct a 3D image by performing a super-resolution with respect to the depth image in which the error point is relocated.

21 Claims, 12 Drawing Sheets

APPARATUS AND METHOD FOR RECONSTRUCTING SUPER-RESOLUTION THREE-DIMENSIONAL IMAGE FROM DEPTH IMAGE

CROSS-REFERENCE TO RELATED APPLICATIONS

This application claims the priority benefit of Korean Patent Application No. 10-2012-0114818, filed on Oct. 16, 2012, in the Korean Intellectual Property Office, the disclosure of which is incorporated herein by reference.

BACKGROUND

1. Field

Example embodiments of the following disclosure relate to an apparatus and method for reconstructing a super-resolution three-dimensional (3D) image from a depth image, and more particularly, to technology for generating a super-resolution/super-precision 3D image, by relocating an error point using, for example, a matched color or ambient depth shape information to reduce an error in a boundary area, determining a super-resolution performance area of the depth image, and determining a density of a pixel to be inserted in a form in which a weight is assigned to a difference in a value of z, in the determined super-resolution performance area.

2. Description of the Related Art

In image processing, a three-dimensional (3D) image may be reconstructed from a two-dimensional (2D) depth image using a depth image processing process.

In the depth image processing process, noise points occurring around a boundary of an object or forming a large angle with a camera, for example, may be removed from a depth image, and the depth image without the noise points may be used to reconstruct the 3D image.

When a reflected infrared reflectance (IR) value at a position at which pieces of depth information differ is used for depth calculation, the value may bring about an error. Accordingly, removing the noise points may result in resolution deterioration, or shape distortion, and the like. In addition, holes may be represented in a final 3D image to be reconstructed.

In addition, in a widely used super-resolution process, a 2D super-resolution may be performed with respect to a depth image. Accordingly, the super-resolution may fail to be performed sufficiently with respect to a surface of an object inclined in a z direction, and holes may be generated.

Accordingly, there is a need for an improvement upon the reconstructing of a 3D image from a depth image using a super-resolution operation.

SUMMARY

The foregoing and/or other aspects are achieved by providing an apparatus for reconstructing an image, the apparatus including an error point relocation processing unit to relocate an error point in a depth image, and a super-resolution processing unit to reconstruct a 3D image by performing a super-resolution with respect to the depth image in which the error point is relocated.

The error point relocation processing unit may relocate an error point positioned within a predetermined distance from an object boundary in the depth image.

The error point relocation processing unit may determine a point to be the error point when a difference between a depth value of the point and a depth value of a pixel in a predetermined section of the depth image is greater than or equal to a predetermined threshold value.

The error point relocation processing unit may identify one of a foreground point set and a background point set as a point set adjacent to the error point, and may relocate the error point to the identified adjacent point set.

The super-resolution processing unit may perform a super-resolution with respect to different points, based on depth values of the different points in the depth image.

The super-resolution processing unit may perform the super-resolution, by adjusting a number of pixels to be inserted between two-dimensional (2D) coordinates of the different points, based on the depth values.

The super-resolution processing unit may determine a first unit point set included in the depth image and arranged within the depth image.

The super-resolution processing unit may determine the first unit point set including at least one point among foreground points and background points arranged in the depth image.

The super-resolution processing unit may perform a super-resolution with respect to a section of the depth image to be identified as the first unit point set when only the foreground points or only the background points are included in the determined first unit point set.

The super-resolution processing unit may additionally determine an adjacent second unit point set when a background point and a plurality of foreground points are included in the determined first unit point set.

The super-resolution processing unit may perform a super-resolution with respect to a portion of the section in the depth image to be identified as the first unit point set, and the adjacent second unit point set additionally determined.

The super-resolution processing unit may perform a super-resolution with respect to an area identified through at least one foreground and included in the first unit point set and the adjacent second unit point set additionally determined.

The super-resolution processing unit may omit performing of a super-resolution with respect to a section of the depth image to be identified as the first unit point set when a single foreground point is included in the determined first unit point set.

The foregoing and/or other aspects are achieved by providing a method of reconstructing a super-resolution 3D image, the method including relocating an error point in a depth image, and reconstructing a 3D image by performing a super-resolution with respect to the depth image in which the error point is relocated.

The relocating may include determining a point to be the error point when a difference between a depth value of the point and a depth value of a pixel in a predetermined section of the depth image is greater than or equal to a predetermined threshold value, identifying one of a foreground point set and a background point set as a point set adjacent to the error point, and relocating the error point to the identified adjacent point set.

The reconstructing may include performing a super-resolution operation with respect to different points, based on depth values of the different points in the depth image.

The reconstructing may include determining a first unit point set included in the depth image and arranged within the depth image, and performing a super-resolution with respect to a section of the depth image to be identified as the first unit point set when only the foreground points or only the background points are included in the determined first unit point set.

The reconstructing may include determining a first unit point set included in the depth image and arranged within the depth image, additionally determining an adjacent second unit point set when a background point and a plurality of foreground points are included in the determined first unit point set, and performing a super-resolution with respect to a portion of the section of the depth image to be identified as the first unit point set, and the adjacent second unit point set additionally determined.

The foregoing and/or other aspects are achieved by providing a method for image processing, the method including: relocating an identified error point in a depth image; determining a super-resolution performance area of the depth image; and performing a super-resolution operation with respect to the super-resolution performance area.

Further, whether the super-resolution performance area is to be extended may be determined.

A point may be identified as the error point when a difference between a depth value of the point and a depth value of a pixel in a predetermined section of the depth image is greater than or equal to a predetermined threshold value.

The super-resolution performance area may be extended by additionally determining a second unit point set adjacent to a first unit point set.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
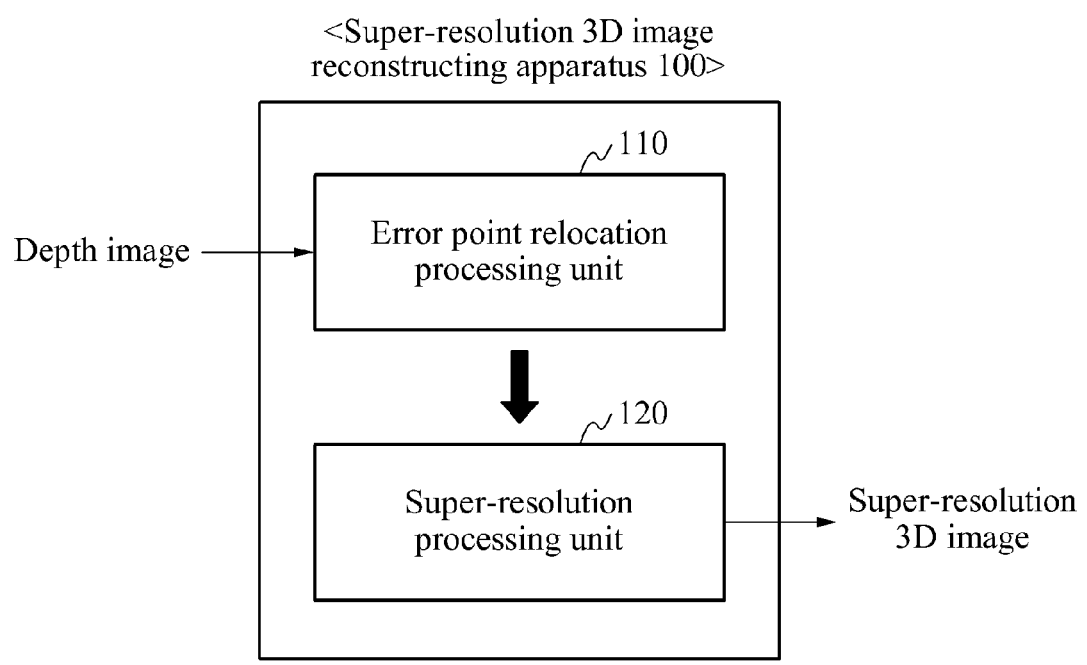
FIG. 1 illustrates an apparatus for reconstructing a super-resolution three-dimensional (3D) image, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

When it is determined that a detailed description is related to a related known function or configuration which may make the purpose of the present disclosure unnecessarily ambiguous in the description, such detailed description will be omitted. Also, terminologies used herein are defined to appropriately describe the exemplary embodiments, and thus, may be changed depending on a user, the intent of an operator, or a custom. Accordingly, the terminologies must be defined based on the following overall description of this specification.

FIG. 1 illustrates a super-resolution 3D image reconstructing apparatus 100 (hereinafter, the apparatus 100) for reconstructing a super-resolution three-dimensional (3D) image, according to example embodiments.

Referring to FIG. 1, the apparatus 100 may include an error point relocation processing unit 110 and a super-resolution processing unit 120. Each of the error point relocation processing unit 110 and the super-resolution processing unit 120 may include at least one processing device.

The error point relocation processing unit 110 may relocate an error point in a depth image.

For example, the error point relocation processing unit 100 may locate noise points occurring in a photographed low-resolution depth image to a corresponding foreground area or a corresponding background area, rather than removing the noise points.

In particular, the error point relocation processing unit 110 may relocate the noise points using a matched color or ambient depth shape information, thereby reducing an error in a boundary area.

Further, the error point relocation processing unit 110 may identify a point as being an error point.

In order to identify an error point, the error point relocation processing unit 110 may determine a point to be the error point when a difference between a depth value of the point and a depth value of a pixel in a predetermined section of the depth image is greater than or equal to a predetermined threshold value. This method of determining a point to be the error point is an example, and thus, the present disclosure is not limited thereto.

For example, a point having a depth value differing greatly from depth values of ambient pixels may be determined to be the error point.

The error point relocation processing unit 110 may relocate an error point positioned within a predetermined distance from an object boundary in the depth image.

The error point relocation processing unit 110 may identify one of a foreground point set and a background point set as a point set adjacent to the error point. In addition, the error point relocation processing unit 110 may relocate the error point to the identified adjacent point set.

Depending on embodiments, the error point may be replaced with a value of z of a z axis or an approximate value in a direction of a value not corresponding to a closest orphan, for example, a value not corresponding to an error. In this instance, values of x and y may be changed in proportion to a change in the value of z. In addition, when a color or an intensity value is present, a weight may be reflected in determining the approximate value of z.

Herein, the term "foreground point" may be construed as a point having a depth value identified as being less than or equal to a predetermined criterion, and the term "background point" may be construed as a point having a depth value identified as being greater than the predetermined criterion.

Moreover, the super-resolution processing unit 120 may reconstruct a 3D image by performing a super-resolution operation with respect to the depth image in which the error point is relocated.

The super-resolution processing unit 120 may perform a super-resolution operation with respect to different points, based on depth values of the different points in the depth image.

For example, the super-resolution processing unit 120 may perform the super-resolution operation by adjusting a number of pixels to be inserted between two-dimensional (2D) coordinates of the different points, based on the depth values.

In particular, when a difference between depth values is relatively great, in spite of a distance between the 2D coordinates (e.g. x and y coordinates) being relatively short, an actual distance on a z axis may be determined to be relatively long. Accordingly, a number of pixels to be inserted between the 2D coordinates may be increased.

The super-resolution processing unit 120 may determine a unit point set in order to determine a super-resolution performance area before the super-resolution operation is performed with respect to the depth image.

The super-resolution processing unit 120 may determine a first unit point set included in the depth image, and arranged in a form of a lattice within the depth image.

Herein, as an example, for ease of description, a unit point set may be construed as a set including four foreground points or background points included in a lattice, however, the present disclosure is not limited thereto.

In particular, in order to determine the super-resolution performance area before the super-resolution is performed with respect to the depth image, the first unit point set identified based on points represented on x and y coordinates may be classified into four types. The super-resolution performance area may be determined using the four types, for example. Notably, the present disclosure is not limited to the four types, discussed below.

The four types of the first unit point set may be classified as follows.

The four types may include a case A in which all points included in the first unit point set correspond to foreground points or background points, a case B in which a single background point is included in the first unit point set, a case C in which two background points are included in the first unit point set, and a case D in which three background points are included in the first unit point set.

With respect to the case A, the super-resolution processing unit 120 may perform a weighted super-resolution which is a subsequent operation, with respect to all regions in an area identified as the first unit point set.

For example, the super-resolution processing unit 120 may determine a first unit point set including at least one point among foreground points and background points arranged in a form of a lattice within the depth image, to be a unit point set of the case A.

All regions in the area identified as the first unit point set may be determined to be the super-resolution performance area.

In this instance, for example, the super-resolution operation may be performed with respect to a section of the depth image identified as the first unit point set when only the foreground points or only the background points are included in the determined first unit point set.

With respect to the case B and the case C, the super-resolution processing unit 120 may additionally determine a second unit point set adjacent to the first unit point set, rather than determining the super-resolution performance area for performing the super-resolution.

For example, the super-resolution processing unit 120 may additionally determine the adjacent second unit point set when a background point and a plurality of foreground points are included in the determined first unit point set.

In particular, when two or three foreground points are included in the first unit point set, the super-resolution processing unit 120 may additionally determine the adjacent second unit point set.

When three background points are included in the second unit point set additionally determined, the super-resolution processing unit 120 may suspend a task for determining an adjacent point set.

The super-resolution processing unit 120 may determine a region identified as foreground points included in the first unit set and the second unit set to be the super-resolution performance area.

In particular, the super-resolution processing unit 120 may perform the super-resolution operation with respect to a portion of the section within the depth image identified as the first unit point set, and the adjacent second unit point set additionally determined.

With respect to the case D in which three background points are included in the first unit point set, the super-resolution processing unit 120 may exclude the first unit point set from the super-resolution performance area. Accordingly, the super-resolution processing unit 120 may omit performing of the super-resolution with respect to the first unit point set in case D.

In particular, with respect to the case A and the case D, the super-resolution processing unit 120 may choose between performing of the super-resolution operation or omitting of the super-resolution operation, rather than separately performing an additional task for determining the super-resolution performance area.

However, with respect to the case B and the case C, the super-resolution processing unit 120 may be required to determine a predetermined portion of the section identified as the first unit point set to be the super-resolution performance area.

In the determining of the predetermined portion of the section identified as the first unit point set to be the super-resolution performance area, the super-resolution processing unit 120 may additionally determine a second unit point set adjacent to the first unit point set. Accordingly, the super-resolution operation may be performed on at least a portion of the first unit point set and the second unit point set.

The super-resolution processing unit 120 may determine a density of a pixel to be inserted in a form in which a weight is assigned to a difference in a value of z, in the determined super-resolution performance area.

By performing a sufficient super-resolution operation with respect to a surface of an object inclined in a z direction, generation of holes in a 3D image to be reconstructed may be prevented.

Figure 2A:
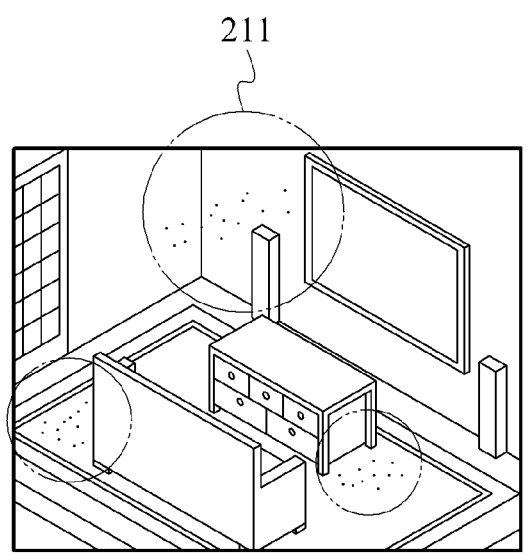
FIGS. 2A and 2B illustrate an example of comparing a depth image, and a depth image in which an error point is relocated, according to example embodiments.
Figure 2B:
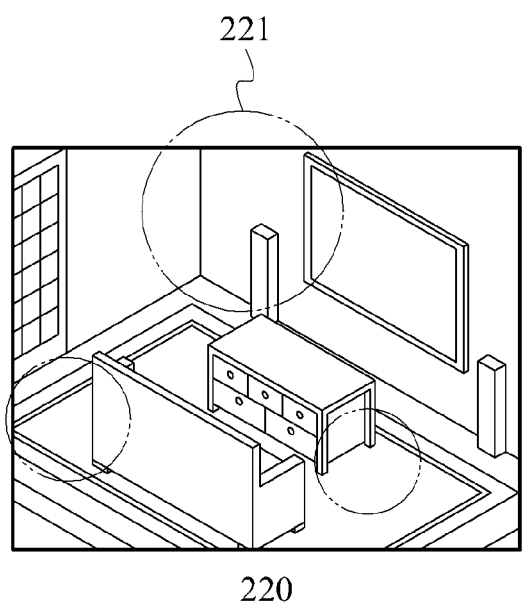

FIGS. 2A and 2B illustrate an example of comparing a depth image, and a depth image in which an error point is relocated according to example embodiments.

Referring to FIG. 2A, a view 210 may correspond to a low-resolution depth image photographed by a depth camera. The view 210 may include noise points 211, for example, having depth values absolutely differing from depth values of ambient pixels.

According to the art, the noise points 211 generated in a boundary portion of an object may be simply removed. As such, issues, for example, resolution deterioration, shape distortion, generation of holes, and the like, may be caused, thereby causing error in the 3D image.

However, an error point relocation processing unit 110, according to example embodiments of the present disclosure, may relocate the noise points 211 to a corresponding foreground area or a corresponding background area, as shown in a view 220 of FIG. 2B, rather than removing the noise points 211 generated in the boundary portion of the object.

Accordingly, the error point relocation processing unit 110 may arrange an area 221 so that an area in which the noise points 211 are included may have a depth value similar to the depth values of the ambient pixels, thereby preventing such issues, for example, resolution deterioration, shape distortion, generation of holes, and the like.

Figure 3:
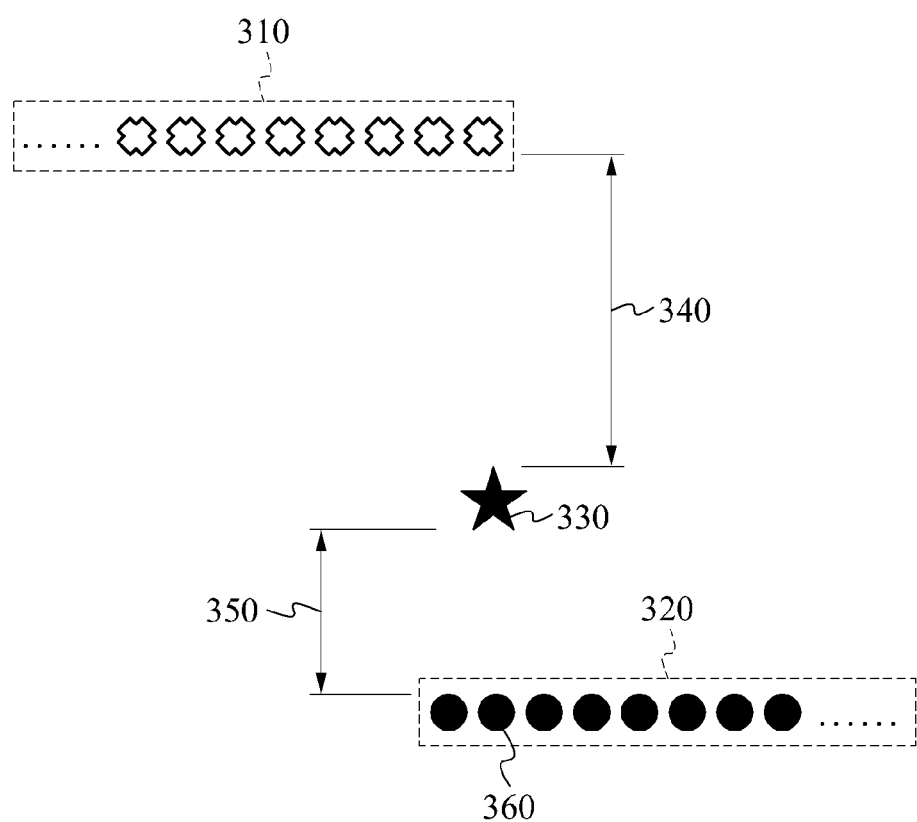
FIG. 3 illustrates an example of relocating an error point, according to example embodiments.

FIG. 3 illustrates an example of relocating an error point 330, according to example embodiments.

An error point relocation processing unit 110 according to example embodiments may determine a point as being the error point 330 when a difference between a depth value of the point and a depth value of a pixel in a predetermined section of a depth image is greater than or equal to a predetermined threshold value.

The error point relocation processing unit 110 may relocate the error point 330 to a background point set 310 or a foreground point set 320, instead of removing the error point 330, thereby preventing distortion issues, for example.

In this instance, the error point relocation processing unit 110 may identify one of the background point set 310 and the foreground point set 320 as a point set adjacent to the error point 330.

In particular, the error point relocation processing unit 110 may calculate a shortest distance 340 between the error point 330 and the background point set 310, and may calculate a shortest distance 350 between the error point 330 and the foreground point set 320.

The error point relocation processing unit 110 may compare the shortest distance 340 to the shortest distance 350.

Due to the shortest distance 350 being determined to be shorter than the shortest distance 340 as a result of the comparison, the error point relocation processing unit 110 may determine that the error point 330 is generated from the foreground point set 320.

Accordingly, the error point relocation processing unit 110 may relocate the error point 330 to the foreground point set 320.

In this instance, the error point relocation processing unit 110 may relocate the error point 330 to a vicinity of a foreground point 360 closest to the error point 330 in the foreground point set 320.

Accordingly, generation of 3D holes in a 3D image to be reconstructed may be prevented because error points are relocated instead of removed, and an error in the boundary portion may be reduced.

FIGS. 4A through 7 illustrate various types of unit points, and a super-resolution at each unit point, according to example embodiments.

A super-resolution processing unit 120, according to example embodiments of the present disclosure, may determine a super-resolution performance area before a super-resolution is performed with respect to a depth image. Further, the super-resolution processing unit 120 may determine a density of a pixel to be inserted by assigning a weight to a difference in a value of z in the determined super-resolution performance area, thereby generating a 3D image with an increased quality.

In order to determine the super-resolution performance area, the super-resolution processing unit 120 may classify four point sets on x, y coordinates into four types of unit point sets, and may determine the super-resolution performance area using the classified unit point sets. The use of four types of unit point sets is exemplary, and thus, the present disclosure is not limited thereto.

In particular, in order to determine the super-resolution performance area before the super-resolution is performed with respect to the depth image, a first unit point set identified based on points represented on x, y coordinates may be classified into four types, and may determine the super-resolution performance area using the four types. Again, these four types discussed above are exemplary.

The four types of the first unit point set may be classified as follows.

Figure 4A:
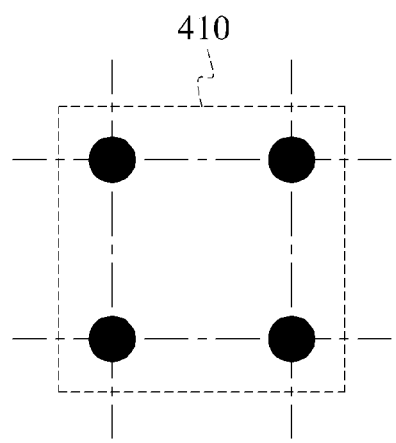
FIGS. 4A through 7 illustrate various types of unit points, and a super-resolution at each unit point, according to example embodiments.
Figure 4B:
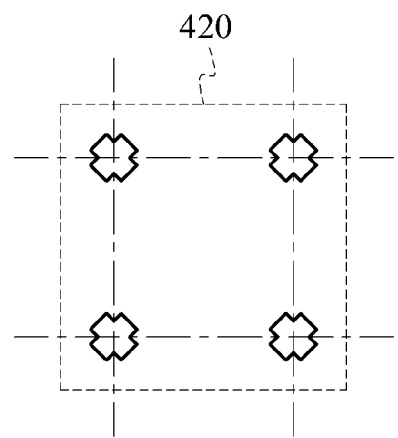

As shown in FIGS. 4A and 4B, a case in which all points included in a first unit point set 410 correspond to foreground points, or a case in which all points included in a first unit point set 420 correspond to background points may be classified as a case A.

In the case A, an apparatus for reconstructing a super-resolution 3D image, for example, apparatus 100 of FIG. 1, may choose between performing of the super-resolution or omitting of the super-resolution, rather than separately performing an additional task for determining the super-resolution performance area.

For example, with respect to the case A, when all of the points included in the first unit point set 410 correspond to foreground points, the super-resolution operation may be performed with respect to an area identified as a foreground point included in the first unit point set 410, using another foreground point.

In particular, the apparatus 100 may determine the area identified as the foreground point included in the first unit point set 410 to be the super-resolution performance area.

In addition, with respect to the case A, when all of the points included in the first unit point set 420 correspond to background points, the super-resolution may be performed with respect to an area identified as a background point included in the first unit point set 420, using another background point.

In particular, the apparatus 100 may determine the area identified as the background point included in the first unit point set 420 to be the super-resolution performance area.

Figure 5A:
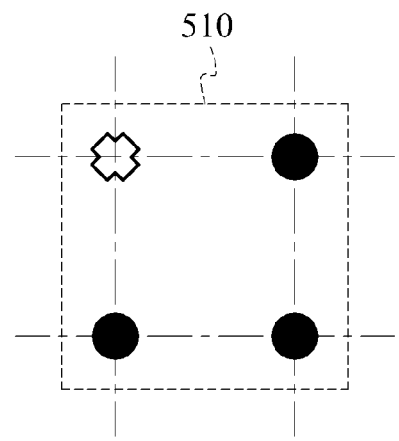

As shown in FIG. 5A, a case in which a single background point is included in a first unit point set 510 may be classified as a case B.

Figure 5B:
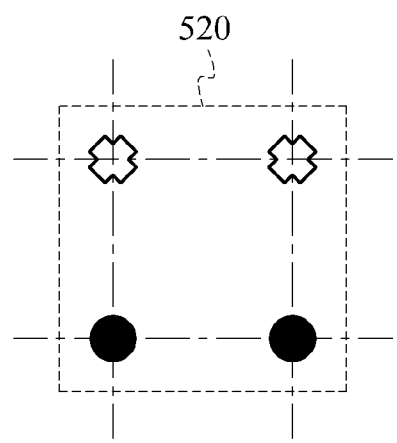

In addition, as shown in FIG. 5B, a case in which two background points are included in a first unit point set 520 may be classified as a case C.

The apparatus 100 may delay performing of a super-resolution operation with respect to the case B and the case C. In particular, with respect to the case B and the case C, the apparatus 100 may additionally determine a second unit point set adjacent to the first unit point set 510 or 520, rather than determining an area identified as the foreground point included in the first unit point set 410, for example, to be the super-resolution performance area for performing the super-resolution.

Figure 6A:
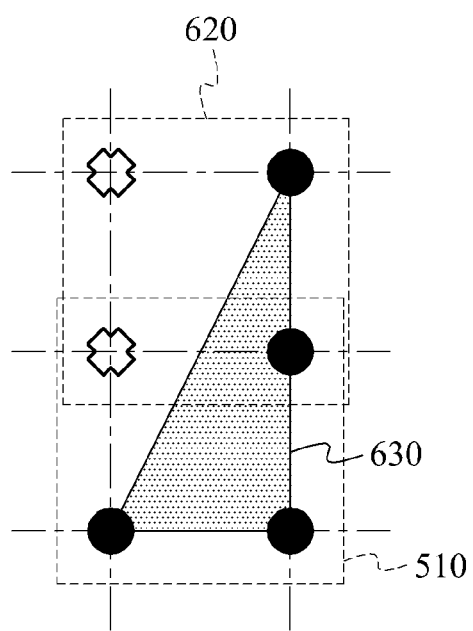
Figure 6B:
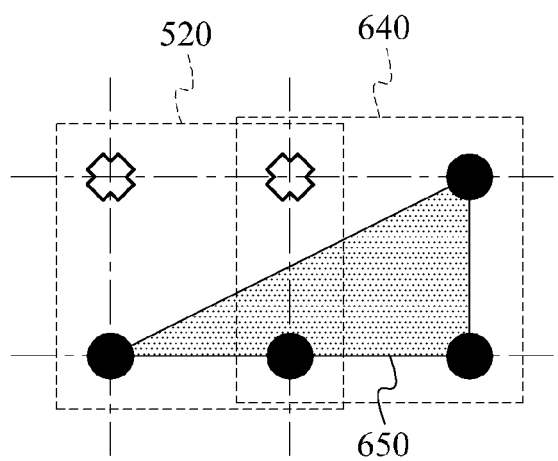

FIG. 6A illustrates an example of additionally determining a second unit point set 620 adjacent to the first unit point set 510, and FIG. 6B illustrates an example of additionally determining a second unit point set 640 adjacent to the first unit point set 520.

Referring to FIG. 6A, the apparatus 100 may identify a point set adjacent to the first unit point set 510, and may determine an area 630 represented with respect to the second unit point set 620 in the identified adjacent point set.

For example, the apparatus 100 may perform the super-resolution operation with respect to the area 630 identified through at least one foreground point and included in the first unit point set 510 and the adjacent second unit point set 620 additionally determined.

In particular, the area 630 identified through the at least one foreground point may be provided in a form of a right triangle, as shown in FIGS. 6A and 6B, however, the present disclosure is not limited thereto.

The apparatus 100 may determine the area 630 identified as foreground points included in the first unit point set 510 and the second unit point set 620 to be the super-resolution performance area.

Depending on embodiments, a hypotenuse of a right triangle identifying the area 630 may be determined to be provided in a shape of a curve to which a weight of a value of z is applied, as opposed to a straight line.

Similarly, referring to FIG. 6B, the apparatus 100 may identify a point set adjacent to the first unit point set 520, and may determine an area 650 provided in a form of a right triangle and represented with respect to the second unit point set 640 in the identified adjacent point set.

In other words, the apparatus 100 may determine the area 650 identified as foreground points included in the first unit point set 520 and the second unit point set 640 to be the super-resolution performance area.

Depending on embodiments, a hypotenuse of the right triangle which identifies the area 650 may be determined to be provided in a shape of a curve to which a weight of a value of z is applied, as opposed to a straight line.

However, the apparatus 100 may suspend a task for determining an adjacent point set when three background points are included in the second unit point set additionally determined.

Figure 7:
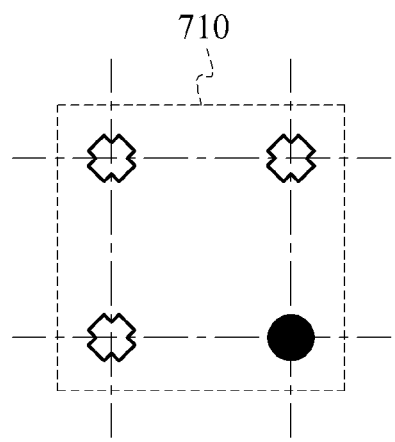

As shown in FIG. 7, a case in which three background points are included in a first unit point set 710 may be classified as a case D.

With respect to the case D, the apparatus 100 may exclude the first unit point set 710 from a super-resolution performance area. Accordingly, the apparatus 100 may omit performing of a super-resolution with respect to the first unit point set 710.

In particular, with respect to the case A and the case D, the apparatus 100 may choose between performing of the super-resolution or omitting of the super-resolution, rather than separately performing an additional task for determining the super-resolution performance area.

In addition, with respect to the case B and the case C, the apparatus 100 may determine the super-resolution performance area, and may perform a more precise super-resolution.

That is, in the process of determining the super-resolution performance area, the apparatus 100 may determine whether the super-resolution performance area is to be extended, by additionally determining a second unit point set adjacent to the first unit point set.

When the super-resolution performance area is determined to be expandable by the additionally determined second unit point set, a section identified as the second unit point set may be added to the super-resolution performance area.

The apparatus 100 may determine a density of a pixel to be inserted, in a form in which a weight is assigned to a difference in a value of z, in the determined super-resolution performance area.

The apparatus 100 may perform a weighted super-resolution, by a process of inserting a number of pixels proportional to a difference in a maximum value of the value of z in the determined super-resolution performance area.

By performing a sufficient super-resolution with respect to a surface of an object inclined in a z direction, generation of holes in a 3D image to be reconstructed may be prevented.

Figure 8:
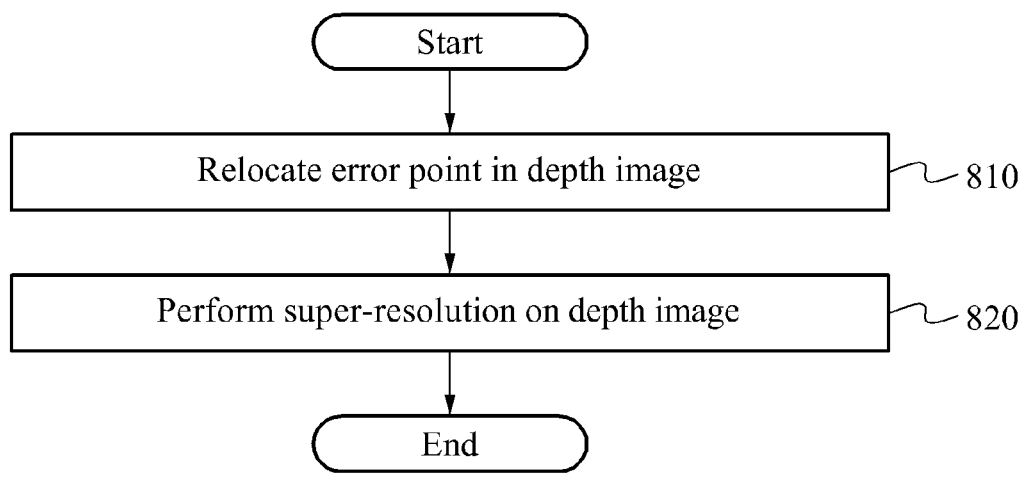
FIG. 8 is a flowchart illustrating an exemplary method of reconstructing a super-resolution 3D image, according to example embodiments.

FIG. 8 illustrates a method of reconstructing a super-resolution 3D image, according to example embodiments.

Referring to FIG. 8, in operation 810, a point determined to be an error point may be relocated in a depth image.

For example, in order to relocate the error point in the depth image, a point may be determined to be the error point when a difference between a depth value of the point and a depth value of a pixel in a predetermined section of the depth image is greater than or equal to a predetermined threshold value.

In addition, one of a foreground point set and a background point set may be identified as a point set adjacent to the error point.

The error point may be relocated to the identified adjacent point set.

In operation 820, a 3D image may be reconstructed by performing a super-resolution with respect to the depth image in which the error point is relocated.

In order to reconstruct the 3D image by performing the super-resolution with respect to the depth image, the super-resolution may be performed with respect to different points, based on depth values of the different points of the depth image.

In addition, a first unit point set included in the depth image and arranged in a form of a lattice in the depth image may be determined.

Further, when only foreground points or only background points are included in the determined first unit point set, the super-resolution may be performed with respect to a section of the depth image identified as the first unit point set.

When a background point and a plurality of foreground points are included in the determined first unit point set, an adjacent second unit point set may be additionally determined.

In addition, the super-resolution may be performed with respect to a portion of the section of the depth image identified as the first unit point set, and the adjacent second unit point set additionally determined.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An apparatus for reconstructing an image, the apparatus comprising:
   an error point relocation processing unit configured to relocate an error point in a depth image; and
   a super-resolution processing unit configured to reconstruct a three-dimensional (3D) image by performing a super-resolution operation with respect to the depth image in which the error point is relocated
   wherein the error point relocation processing unit identifies one of a foreground point set and a background point set as a point set adjacent to the error point, and relocates the error point to the identified adjacent point set.

2. An apparatus for reconstructing an image, the apparatus comprising:
   an error point relocation processing unit configured to relocate an error point in a depth image; and
   a super-resolution processing unit configured to reconstruct a three-dimensional (3D) image by performing a super-resolution operation with respect to the depth image in which the error point is relocated
   wherein the error point relocation processing unit relocates an error point positioned within a predetermined distance from an object boundary within the depth image
   wherein the error point relocation processing unit determines a point to be the error point when a difference between a depth value of the point and a depth value of a pixel in a predetermined section of the depth image is greater than or equal to a predetermined threshold value.

3. The apparatus of claim 1, wherein the super-resolution processing unit performs a super-resolution operation with respect to different points, based on depth values of the different points in the depth image.

4. The apparatus of claim 3, wherein the super-resolution processing unit performs the super-resolution operation, by adjusting a number of pixels to be inserted between two-dimensional (2D) coordinates of the different points, based on the depth values.

5. The apparatus of claim 1, wherein the super-resolution processing unit determines a first unit point set included in the depth image and arranged within the depth image.

6. The apparatus of claim 5, wherein the super-resolution processing unit determines the first unit point set comprising at least one point among foreground points and background points arranged in the depth image.

7. The apparatus of claim 5, wherein the super-resolution processing unit performs a super-resolution operation with respect to a section of the depth image to be identified as the first unit point set when only the foreground points or only the background points are included in the determined first unit point set.

8. The apparatus of claim 5, wherein the super-resolution processing unit additionally determines an adjacent second unit point set when a background point and a plurality of foreground points are included in the determined first unit point set.

9. The apparatus of claim 8, wherein the super-resolution processing unit performs a super-resolution operation with respect to a portion of the section in the depth image to be identified as the first unit point set, and the adjacent second unit point set additionally determined.

10. The apparatus of claim 9, wherein the super-resolution processing unit performs a super-resolution with respect to an area identified through at least one foreground point included in the first unit point set and the second unit point set additionally determined.

11. The apparatus of claim 5, wherein the super-resolution processing unit omits performing of a super-resolution operation with respect to a section of the depth image to be identified as the first unit point set when a single foreground point is included in the determined first unit point set.

12. A method of reconstructing an image, the method comprising:
    relocating, by a processor, an error point in a depth image; and
    reconstructing a 3D image by performing a super-resolution operation with respect to the depth image in which the error point is relocated
    wherein the relocating comprises identifying one of a foreground point set and a background point set as a point set adjacent to the error point; and
    relocating the error point to the identified adjacent point set.

13. The method of claim 12, wherein the relocating comprises:
    determining a point to be the error point when a difference between a depth value of the point and a depth value of a pixel in a predetermined section of the depth image is greater than or equal to a predetermined threshold value.

14. The method of claim 12, wherein the reconstructing comprises performing a super-resolution operation with respect to different points, based on depth values of the different points in the depth image.

15. A method of reconstructing an image, the method comprising:
    relocating, by a processor, an error point in a depth image; and
    reconstructing a 3D image by performing a super-resolution operation with respect to the depth image in which the error point is relocated
    wherein the reconstructing comprises:
    determining a first unit point set included in the depth image and arranged within the depth image; and
    performing a super-resolution operation with respect to a section of the depth image to be identified as the first unit point set when only the foreground points or only the background points are included in the determined first unit point set.

16. The method of claim 12, wherein the reconstructing comprises:
    determining a first unit point set included in the depth image and arranged within the depth image;
    additionally determining an adjacent second unit point set when a background point and a plurality of foreground points are included in the determined first unit point set; and
    performing a super-resolution with respect to a portion of the section in the depth image to be identified as the first unit point set, and the adjacent second unit point set additionally determined.

17. A non-transitory computer-readable medium comprising a program for instructing a computer to perform the method of claim 12.

18. A method for image processing, the method comprising:
    relocating an identified error point in a depth image;
    determining a super-resolution performance area of the depth image; and
    performing a super-resolution operation with respect to the super-resolution performance area
    wherein the relocating comprises identifying one of a foreground point set and a background set as a point set adjacent to the error point, and relocating the error point to the identified adjacent point set.

19. The method of claim 18, wherein the determining comprises determining whether the super-resolution performance area is to be extended.

20. The method of claim 18, wherein a point is identified as the error point when a difference between a depth value of the point and a depth value of a pixel in a predetermined section of the depth image is greater than or equal to a predetermined threshold value.

21. The method of claim 19, wherein the super-resolution performance area is extended by additionally determining a second unit point set adjacent to a first unit point set.

* * * * *